(12) United States Patent
Lanteigne et al.

(10) Patent No.: US 6,557,056 B1
(45) Date of Patent: Apr. 29, 2003

(54) METHOD AND APPARATUS FOR EXCHANGING DATA BETWEEN TRANSACTIONAL AND NON-TRANSACTIONAL INPUT/OUTPUT SYSTEMS IN A MULTI-PROCESSING, SHARED MEMORY ENVIRONMENT

(75) Inventors: Stephen Lanteigne, New Brunswick (CA); David Lewis, Calgary (CA)

(73) Assignee: Nortel Networks Limited, St-Laurent (CA)

( * ) Notice: Subject to any disclaimer, the term of this patent is extended or adjusted under 35 U.S.C. 154(b) by 0 days.

(21) Appl. No.: 09/223,004

(22) Filed: Dec. 30, 1998

(Under 37 CFR 1.47)

(51) Int. Cl.⁷ .................. G06F 13/14; G06F 13/20; G06F 12/06
(52) U.S. Cl. .................. 710/52; 710/53; 710/54; 710/55; 710/56; 710/57; 711/147
(58) Field of Search ................ 710/52, 53, 54, 710/55, 56, 57; 711/147

(56) References Cited

U.S. PATENT DOCUMENTS

| | | | | |
|---|---|---|---|---|
| 5,313,638 A | * | 5/1994 | Ogle et al. ............ | 395/725 |
| 5,428,761 A | * | 6/1995 | Herlihy et al. ......... | 395/425 |
| 5,502,833 A | * | 3/1996 | Byrn et al. ............ | 395/459 |
| 5,588,126 A | * | 12/1996 | Abramson et al. ...... | 395/376 |
| 5,606,666 A | * | 2/1997 | Grant et al. ........... | 395/200.08 |
| 5,617,537 A | * | 4/1997 | Yamada et al. ......... | 395/200.01 |
| 5,758,144 A | * | 5/1998 | Eberhard et al. ....... | 395/602 |
| 5,806,075 A | * | 9/1998 | Jain et al. ............. | 707/201 |
| 5,867,636 A | * | 2/1999 | Walker ................. | 395/114 |
| 5,903,562 A | * | 5/1999 | Engel et al. ........... | 370/390 |
| 5,909,574 A | * | 6/1999 | Meyer ................. | 395/591 |
| 5,918,248 A | | 6/1999 | Newell et al. | |
| 6,064,803 A | * | 5/2000 | Watabe et al. ......... | 395/116 |
| 6,070,147 A | * | 5/2000 | Harms et al. .......... | 705/14 |
| 6,157,927 A | * | 12/2000 | Schaefer et al. ....... | 707/103 |

OTHER PUBLICATIONS

U.S. patent application Ser. No. 08/997,776, Wood et al., filed Dec. 24, 1997.

* cited by examiner

Primary Examiner—Christopher B. Shin
Assistant Examiner—Rehana Perveen

(57) ABSTRACT

The present invention relates to a queuing system, implemented in the memory of a computer by the execution of a program element. The queuing system includes a queue with a plurality of memory slots, a write pointer and a read pointer. The write pointer permits to enqueue data elements in successive memory slots of the queue. The read pointer permits to dequeue data elements from the queue memory slots for processing, where these data elements are potentially non-dequeuable. Upon identifying a non-dequeuable data element in a particular memory slot of the queue, the read pointer is capable to skip over the particular memory slot and move on to a successive memory slot.

13 Claims, 15 Drawing Sheets

METHOD AND APPARATUS FOR EXCHANGING DATA BETWEEN TRANSACTIONAL AND NON-TRANSACTIONAL INPUT/OUTPUT SYSTEMS IN A MULTI-PROCESSING, SHARED MEMORY ENVIRONMENT

FIELD OF THE INVENTION

The present invention relates to the field of multiprocessing in a shared memory computer architecture, particularly for performing Input/Output (IO) applications. specifically, it pertains to a method for interfacing transactional and non-transactional IO systems in the multiprocessing environment.

BACKGROUND OF THE INVENTION

Within the ever evolving world of computer systems, a particular change has arisen with respect to the design of better and faster systems. Originally, systems were implemented in a uni-processor environment, whereby a single Central Processing Unit (CPU), hereafter referred to as processor, was responsible for all computer performance, including computations and IO. Unfortunately, uni-processor designs have built-in bottlenecks, where the address and data buses restrict data transfer to a one-at-a-time trickle of traffic, and the system program counter forces instructions to be executed in strict sequence. Rather than designing better, faster uni-processor machines which will never overcome the bottleneck limitation, a different computer system design was realized in order to effect real improvements in computer performance, specifically the multiprocessor system.

The multiprocessing environment may be a shared memory (tightly coupled) system or a distributed system, and involves the use of more than one processor, also referred to as Processing Element (PE), where these processors share resources, such as IO channels, control units, files and devices. Within a particular distributed multiprocessor system, the processors may be in a single machine sharing a single bus or connected by other topologies (e.g. crossbar, grid, ring), or they might be in several machines using message-passing across a network. In the case of a shared memory multiprocessor system, the processors may be connected to shared memory by a crossbar topology, or they may be using a network. An important capability of the multiprocessor operating system is its ability to withstand equipment failures in individual processors and to continue operation. Although there are different basic operating system organizations for multiprocessor systems, one example is symmetric multiprocessing, where all of the processors are functionally equivalent and can perform IO and computation. In this case, the operating system manages a pool of identical PEs, any one of which may be used to control any IO device or reference any storage unit. Note that the same process may be run at different times by any of the PEs.

The evolution to a multiprocessing environment has brought about a number of changes with respect to the Input/Output system, where this IO system typically provides the interface between programmer applications and IO hardware. It is responsible for attending to individual requirements of the IO devices and for servicing their requirements in an efficient and reliable manner. Furthermore, the IO system hides the details of IO specific implementation from applications, while offering to these applications various IO services, such as mass storage, proprietary messaging, a reset interface and high speed interfaces.

A multiprocessor, shared memory system as disclosed in co-pending U.S. patent application Ser. No. 08/774,548, entitled Ashared Memory Control Algorithm for Mutual Exclusion and Rollback@, by Brian Baker and Terry Newell, and incorporated herein by reference, effects certain permanent system changes in Atransactions@. In this system, multiple processors execute processes that may modify shared memory. Memory changes made by a process executing on a processor do not permanently affect the shared memory until the process successfully completes. During process execution, memory used by a process is Aowned@ by that process; read and write access by other processes is locked out. If a process does not successfully complete or attempts to access memory owned by another process, the process is aborted and memory affected by the process is Arolled back@ to its previous state. Memory changes are only made permanent (or Acommitted@) upon successful process completion. In this context, Atransactions@ may be considered those intervals between initial system accesses that may ultimately permanently affect the system state, and the Acommittal@ of the state changes to the system. This shared memory system is referred to as a transactional system.

Further, a multiprocessor, shared memory computing system is disclosed in co-pending U.S. patent application Ser. No. 08/997,776, entitled AComputing System having Fault Containment@, by Barry Wood et al and assigned to Northern Telecom Limited, the contents of which are also herein incorporated by reference. The multiprocessor system comprises a plurality of processing element modules, input/output processor modules and shared memory modules interconnected with the processing elements and input/output processors. The modules are interconnected by point to multi-point communication links. Shared memory is updated and read by exchanging frames forming memory access transactions over these links.

Specific to the IO system for the novel multiprocessor, shared memory computing systems disclosed by Wood et al. and Baker and Newell, multiple Input Output Processors (IOPs) must share access to certain IO data structures with the various IO software applications running on one or more PEs. Within such a multiprocessor, shared memory architecture, operations on the shared memory data are transactional, meaning that changes are not considered permanent and globally visible until they are committed by an application (i.e. the completion of a transaction). Therefore, IO operations such as sending a message can not be considered permanent until the IO software application has committed its data. On the other hand, IO events are handled by dedicated IO firmware (where firmware consists in programming instructions stored in a read-only memory unit rather than implemented through software) via exceptions, in which the IO firmware is expected to service the exception to completion before continuing. This is characterized as non-transactional since the event is permanent and non-repeatable.

Unfortunately, problems arise when interfacing transactional and non-transactional systems in the multiprocessing, shared memory environment. A non-transactional system will service an event without waiting for the committal of state changes to the system, thus eliminating the possibility of a state roll-back as required in a transactional system. For example, if an IO event was received and ultimately serviced by an IO software application running on a PE, this IO software would be expected to completely handle the event. However, since the IO software application is transactional, the completion of the event is dependent on the transaction completing. Given that the IOP relies on firmware implemented code, and thereby is non-transactional and non-repeatable, the IOP firmware will simply assume that the event was properly serviced In the case where the to software transaction did not complete, the IO event will be lost.

The background information provided above shows that there exists a need in the industry to provide a method and apparatus for interfacing Input/Output transactional and non-transactional systems in a multiprocessing, shared memory environment.

STATEMENT OF THE INVENTION

In summary, the present invention provides a machine readable storage medium containing a program element to implement a queuing system, also referred to as a Flexible Input/output Queuing System (FIQS). Such a queuing system may be used to exchange data elements such as IO commands or application data between application software and an IO service layer. The queuing system includes a queue data structure, preferably a circular queue data structure and two pointers that control the enqueuing of data elements to the queue and the dequeuing of data elements from the queue. One of the pointers is a write pointer and the other pointer is a read pointer. The circular queue data structure allows for running process elements to be inserted into and removed from the queue without blocking each other.

In a specific example, application software takes ownership of the write pointer to enqueue a data element for service by the IO service layer. Since access to the queue is serialized for a minimal amount of time to get ownership of an individual queue element, the application is required to record the progress of a transaction and release the write pointer, thereby allowing other applications to enter the queue. The write pointer becomes available to the same application software again or to a different application software. A queue element is only considered enqueued if the application has written and committed the data to the element. The read pointer controls the dequeuing of data elements from the queue for processing by either the IO service provider or the software application. Specifically, the read pointer sequentially processes the data elements previously enqueued by operation of the write pointer.

The queuing system provides for numerous application programmable features, making it very flexible for the software application. In a specific example, one such feature ensures that if the read pointer encounters a data element in the queue that is not dequeueable, it skips over it. This prevents the queuing system from becoming blocked. A data element may not be dequeueable for a number of reasons, such as the application software may have written but not yet committed the data to the queue, the application software may have stopped running, or any other reason.

This novel queuing system is particularly useful for multiprocessor computing platforms. By forcing the IO service layer and the IO software applications to communicate via the queuing system data structure, non-blocking access between the IO software applications is permitted in a multiprocessor system. The queuing system can support multiple IO service calls from different software applications in a robust manner and may avoid becoming blocked by a single software application.

The invention also extends to a method and a system for performing IO services in a multiprocessing, shared memory environment.

BRIEF DESCRIPTION OF THE DRAWINGS

These and other features of the present invention will become apparent from the following detailed description considered in connection with the accompanying drawings. It is to be understood, however, that the drawings are provided for purposes of illustration only and not as a definition of the boundaries of the invention, for which reference should be made to the appending claims.

DESCRIPTION OF A PREFERRED EMBODIMENT

Figure 1:
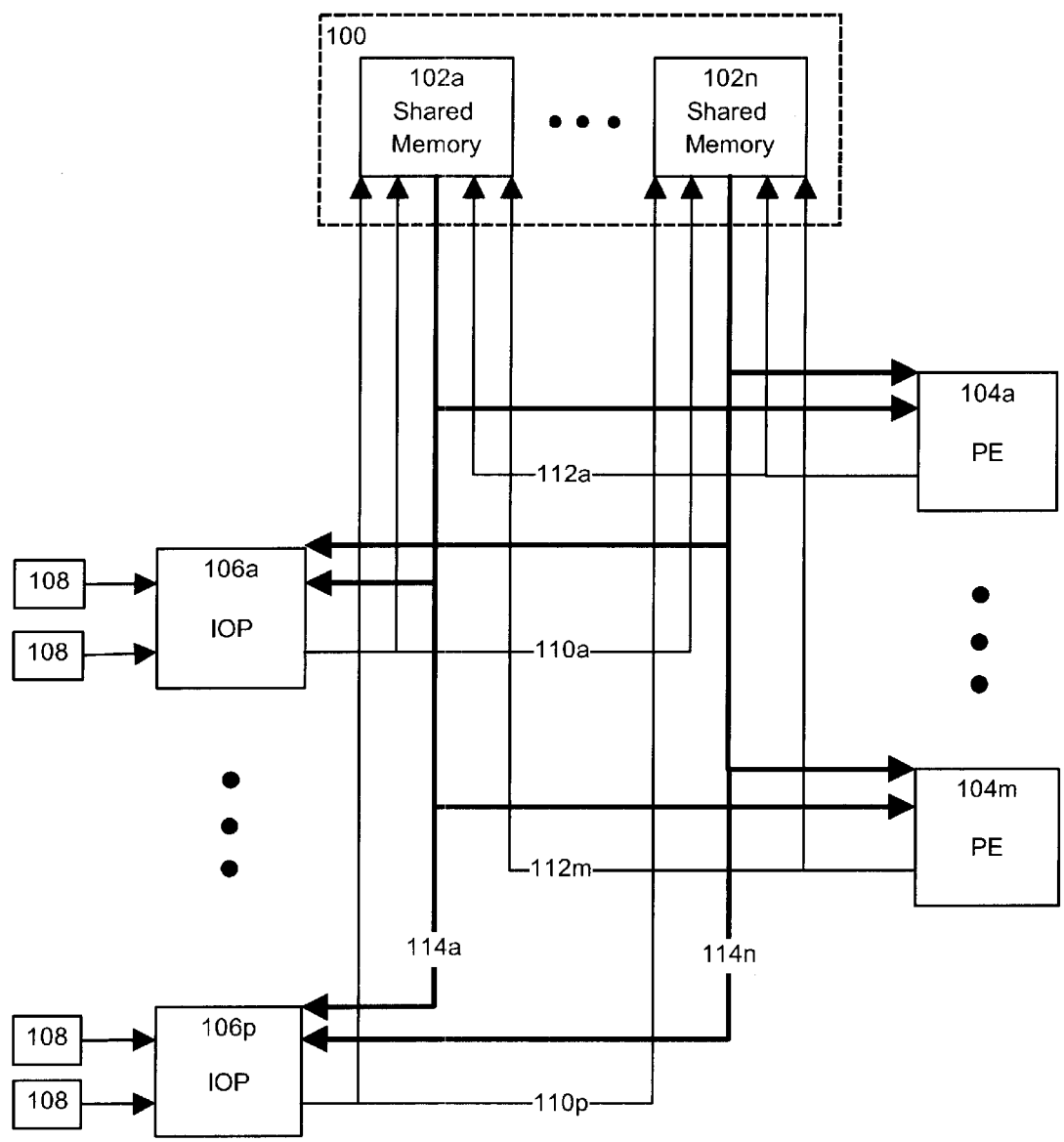
FIG. 1 is a block diagram of a multiprocessor, shared memory computing system, in accordance with an aspect of the present invention.

FIG. 1 illustrates the architecture of a multiprocessor, shared memory computing system in accordance with a preferred embodiment of the present invention. The system comprises shared memory 100, which in turn comprises a plurality of shared memory modules 102a to 102n (collectively and individually referred to as 102). Interconnected with shared memory 100 are a plurality of processing elements (PEs) 104a to 104m (collectively and individually referred to as 104) and a plurality of input/output processors (IOPs) 106a to 106p (collectively and individually referred to as 106). Connected to each IOP 106 is one or more input/output peripherals 108. Such peripherals may include disk and tape storage devices or communications interfaces such as OC3 interfaces.

The architecture of the multiprocessor system shown in FIG. 1 allows scalable processing using one or any other number of PEs 104, up to the limit of physically available slots. The system may be reconfigured simply by inserting a further PE 104. Input/output is similarly scalable and accomplished by inserting more IOPs 106 into the system. Finally, memory of the multiprocessor system is expandable by increasing shared memory 100 by inserting one or more shared memory modules 102 up to the limit of physically available slots, or by increasing the memory capacity of each PE 104 as explained below.

Shared memory 100, PEs 104 and IOPs 106 are interconnected by a set of communication links collectively referred to as an extended architecture interconnect (AXAI@). Physically, the XAI comprises links 110*a* to 110*p* (collectively and individually referred to as 110); 112*a* to 112*m* (collectively and individually referred to as 112; and 114*a* to 114*n* (collectively and individually referred to as 114). These are unidirectional point to multipoint links. Preferably these are serial links.

Each IOP 106 and PE 104 is interconnected with each shared memory module 102 by one of links 110 and 112, respectively.

These links allow a serial transfer of data from IOPs 106 to shared memory modules 102 and PEs 104 to shared memory modules 102. Each IOP 106 or PE 102 broadcasts all of its outgoing data on one associated link 110 or 112 Each link 110 or 112 is interconnected with each shared memory module 102. Thus, all data broadcast by a single IOP 106 or PE 104 is received by all shared memory cards 102.

Each shared memory module 102 is further interconnected with each PE 104 and IOP 106 by a serial link 114. Each of these serial links 114 allows a serial transfer of data from a shared memory module 102 to all IOPs 106 and PEs 104.

Data is transferred between PEs 104, IOPs 106 and shared memory modules 102 in frames, on links 110, 112 and 114. Groups of frames are used to complete transactions between modules 104, 106 and 102, as disclosed in U.S. patent application Ser. No. 08/997,776.

PEs 104 provide the multiprocessor system with multiple spared, fault detection computing engines each operating in a symmetric multi-processing environment. Each PE 104 maintains an independent service state during operation so that each PE may be individually replaced or upgraded without the need to replace any other hardware and without causing any other interruption to the system. Each IOP 106 ultimately provides a standard PCI interface to the multi-processor system for interconnection to a PCI bus based peripheral, such as for example a standard serial interface, an optical (OC3) interface, a SCSI hard disk drive, or a DAT drive.

Figure 2:
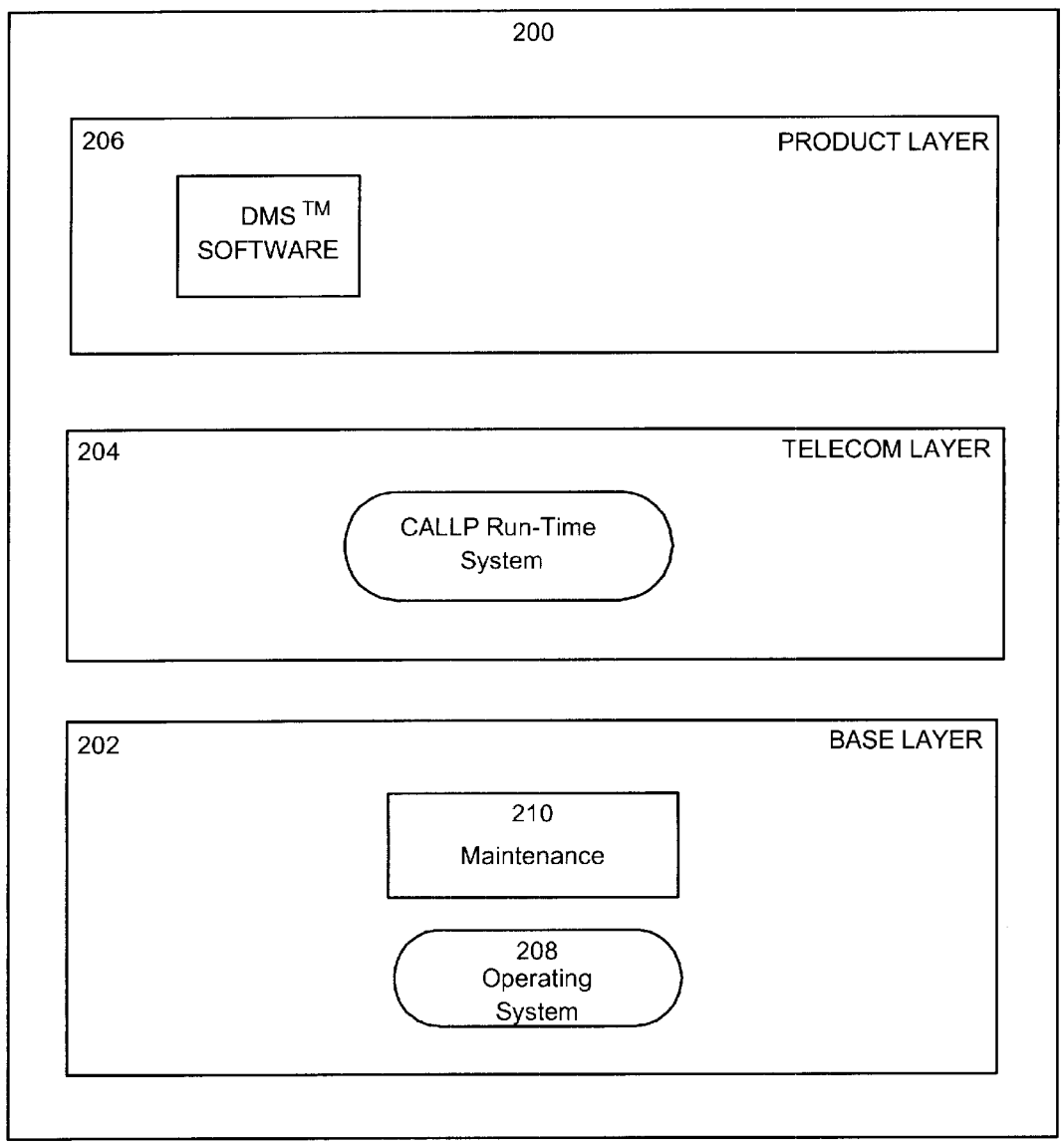
FIG. 2 is a block diagram of the software forming part of the system depicted in FIG. 1.

The architecture of the software used in the multiprocessor, shared memory system shown in FIG. 1 is illustrated in FIG. 2. Specifically, the software system 200 comprises a base layer 202 that interfaces with the hardware of the multiprocessor system and includes an operating system 208 and maintenance software 210. The maintenance software 210 supports the hardware maintenance space, a portion of the multiprocessor address space which is devoted to the access to registers on the module ASICs within the multiprocessor system, where each module has a reserved amount of maintenance space for its own registers. Ultimately, the operating system 208 and maintenance software 210 support the product layer 206 and telecom layer 204, that allow the multiprocessor to act as, in this example, a telecommunications switch.

Identical copies of the program portion of software system 200 are stored in each PE 104. Simultaneously running copies of the program portion of the software system arbitrate overall system co-ordination and scheduling of processing using shared memory 102.

Known IO systems, of the type described above, rely on different mechanisms for ensuring communication between an IO application and an IO service, where this mechanism must somehow pass information to the IO service and receive data from the IO service asynchronously. One such mechanism is the use of queues. A queue could be functionally represented by a First In First Out (FIFO) circular buffer, having two pointers known as the read pointer and the write pointer. The queue is divided into a number of queue elements, where each element can contain one message. There are two general ways to access a queue: enqueue and dequeue. An enqueue describes an operation whereby an element (i.e. a message) is stored into the queue. The enqueue always stores the data immediately after the most recently enqueued element in the queue by using the queue write pointer. A dequeue describes an operation whereby an element (i.e. a message) is removed from the queue. A dequeue always attempts to remove the oldest element in the queue by using the queue read pointer. In either case, the dequeue or enqueue increments the read and write pointers in the same direction around the queue. Note that the first message enqueued to the queue is the first to be dequeued.

The present invention makes use of a novel queuing system for handling high frequency Apayload@ type messaging between software applications and firmware, for use in overcoming the earlier described incompatible interfacing of transactional and non-transactional systems in a multiprocessing, shared memory environment. This novel queuing system offers a number of application programmable features, making it very flexible for the software application. For the purposes of this description, the queuing system will hereafter be referred to as the Flexible Input/output Queuing System (FIQS).

Figure 3:
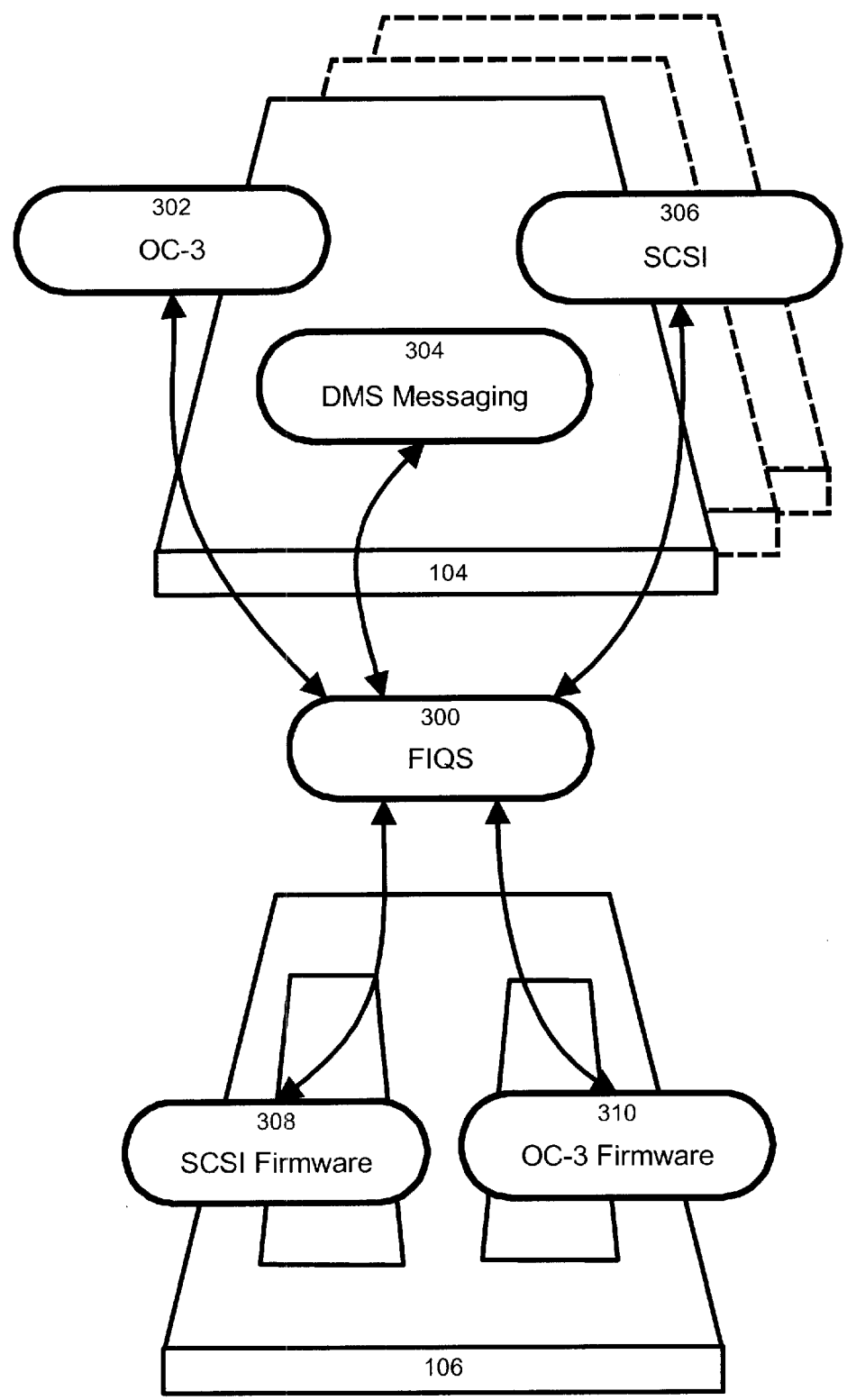
FIG. 3 is a functional block diagram illustrating the relationship between FIQS, software applications and firmware services, in accordance with the present invention.

In a most preferred embodiment of this invention, the FIQS is responsible for providing a mechanism that supports message based communication between software applications on PEs 104 and IO service firmware on IOPs 106. FIG. 3 is a block diagram illustrating the relationships between FIQS 300, the software applications and the firmware services. The multiple PEs 104 support different software applications that perform IO operations, in this example OC-3 302, DMS (Digital Multiplexing Switch) Messaging 304 and SCSI (Small Computer System Interface) 306. The IOP 106 hardware supports the respective IO firmware services for these IO software applications, in this example SCSI Firmware 308 and OC-3 Firmware 310. The SCSI is an intelligent peripheral interface characterized by its use of high level communication between devices, normally a computer and a peripheral device, while the OC-3 firmware is actually an OC-3 based ATM interface to provide high speed messaging to DMS peripherals or switch servers. The above mentioned software applications and service firmware are strictly examples, used in this description for the purpose of clarification. A variety of different applications and firmware may alternatively be supported by the PE and IOP hardware.

Figure 4:
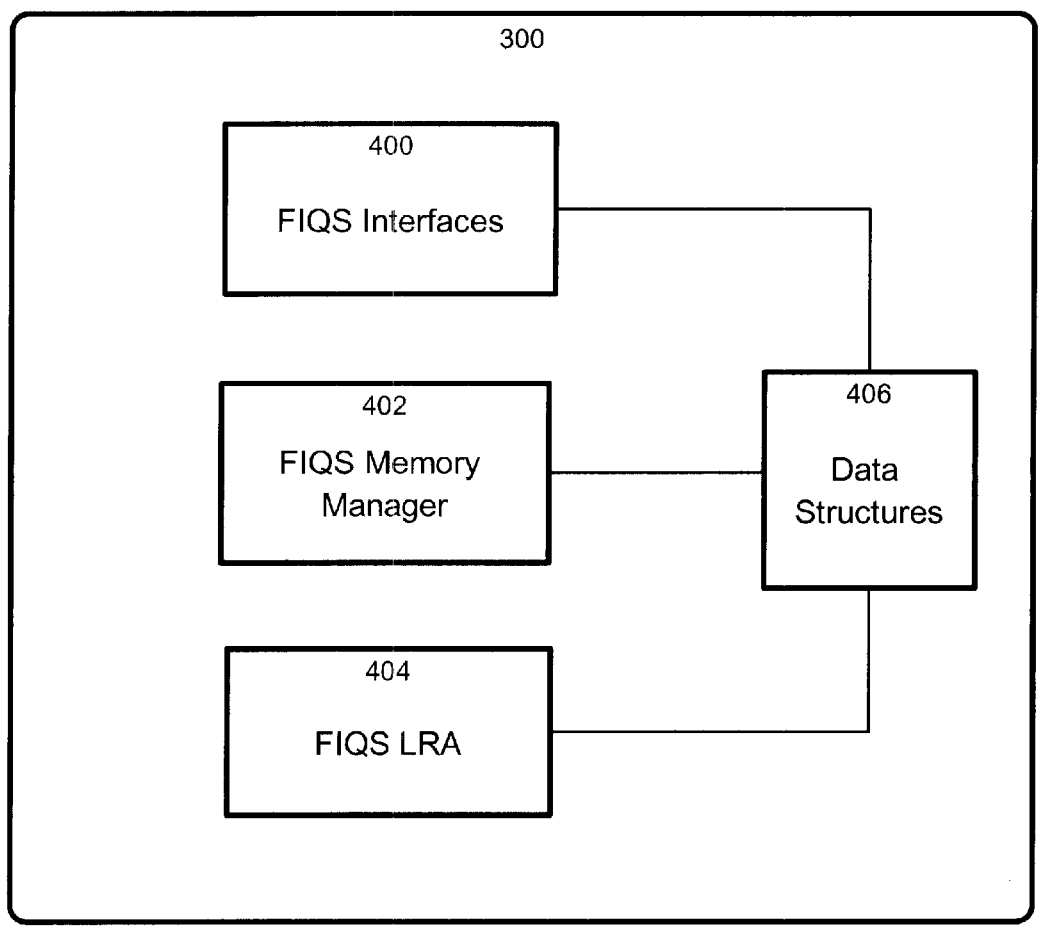
FIG. 4 is a block diagram of the FIQS architecture.

The FIQS 300, serving as a means of access between the software applications and their respective firmware services, includes three main components: software application interfaces, data structures and a mechanism to communicate queue information to IO services on an IOP. FIG. 4 is a block diagram of the FIQS 300 architecture. The FIQS 300 has a four block structure divided up between the PE 104 and the IOP 106. More specifically, the FIQS includes interfaces functional block 400, a memory manager functional block 402 and a Local Responding Agent (LRA) functional block 404, all of which are connected to the FIQS data structures 406. While the interfaces 400 and the memory manager 402 are implemented by program elements comprising a series of instructions executed by the PE 104, the LRA 404 is implemented by the IOP 106 in a similar manner, namely instructions executed by the IOP 106.

An important element of the FIQS is the data structures 406, used to represent a queue. The data structures allow the communication between software applications on the PE 104 and IO services on an IOP 106, and will be described in further detail below. In a preferred embodiment of the present invention, since both the PE 104 and the IOP 106 need to access the data structures 406, the data structures reside in shared memory. Alternatively, the data structures may reside in PE 104 or IOP 106 memory. In a specific example, IO services in the form of packlets are processed by the IOP 106. A packlet is a piece of hardware which can be plugged into the back of the IOP 106 card. Each packlet provides a specific service, for example disk/tape access, a reset interface, and external LAN/WAN connectivity. Therefore, within the memory of the computing platform supporting the IOP 106, a certain portion of the memory will be reserved as shared memory for exclusive use by both the IOP 106 and the PE 104. This reserved portion of shared memory is hereafter referred to as a staging area, and will be described in further detail below.

Figure 5:
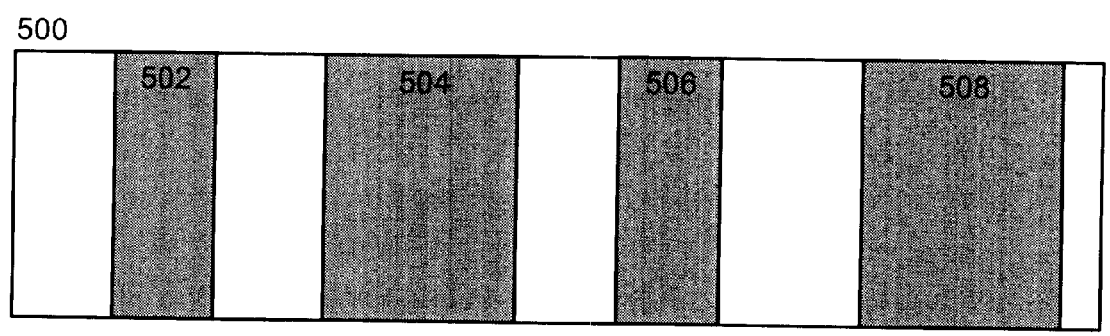
FIG. 5 is a schematic representation of shared memory staging areas, in accordance with the present invention.

Since the IOP 106 requires write access to the FIQS queue, all data structures for the queue are contained in shared memory, specifically in contiguous regions of the shared memory known as staging areas. Such staging areas limit the amount of shared memory that a particular IOP 106 can write to, thus ensuring that the rest of the multiprocessor system shared memory is protected from the particular IOP 106, which does not have built-in fault detection hardware like PEs. However, the IOP 106 read access is not restricted to a particular staging area. FIG. 5 illustrates the shared memory staging areas.

Assume for the sake of this discussion that 4 packlets are to be processed by the IOP 106. The shared memory 500 therefore includes staging areas 502, 504, 506 and 508, one for each packlet. Each staging area is a contiguous block of shared memory. However, as shown in the example shown in FIG. 5, the staging areas are not necessarily contiguous with one another.

The FIQS interfaces block 400 represents all of the interfaces that are available to software to access the queuing system. Note that the FIQS interface component is the only component which is externally visible to software, allowing the applications and maintenance to communicate to FIQS. All other components of FIQS are internal to the design and do not message to external software or firmware. General functionality provided for by the FIQS interfaces 400 includes the ability to enqueue/dequeue to a queue, the ability to create or delete a queue, and the ability to perform queue management. These interfaces are divided into two groups: application interfaces and maintenance interfaces. The former define the means of access that IO software has to manipulate queues, including:

queue creation (in order for FIQS to create a queue, a packlet must previously have been detected by maintenance and an associated staging area setup by FIQS);

queue deletion;

enqueue (different methods exist and will be described in further detail below);

dequeue (different methods exist and will be described in further detail below);

querying a queue (the IO software application can query a queue for information such as the high water mark or the current number of messages on the queue);

re-initializing a queue (this procedure is usually called by the IO software application if queue corruption is detected in the queue or the IO firmware has been reset; all data structures for a queue are re-initialized);

queue element discard (an IO software application can specify that a particular message be removed from a queue; if an IO service is currently dequeuing a message from the queue or has dequeued a message from the queue, the message is considered gone and cannot be discarded);

staging area size request (an IO software application can notify FIQS how large of a staging area it requires for a specific packlet type);

staging area adjustment (an IO software application can change the size of the staging area during run-time; this interface will only attempt to change the size if there is only one application using the packlet, and should only be done when the packlet is disabled).

On the other hand, maintenance interfaces support a communication mechanism between the FIQS memory manager, the multiprocessor system operating system and the system hardware responsible for implementing shared memory transactions, including:

staging area creation (maintenance notifies FIQS to setup a staging area in shared memory; this interface is called whenever a packlet is detected);

staging area deletion (maintenance notifies FIQS to remove a staging area from shared memory; this interface is called whenever a packlet is removed).

Figure 6:
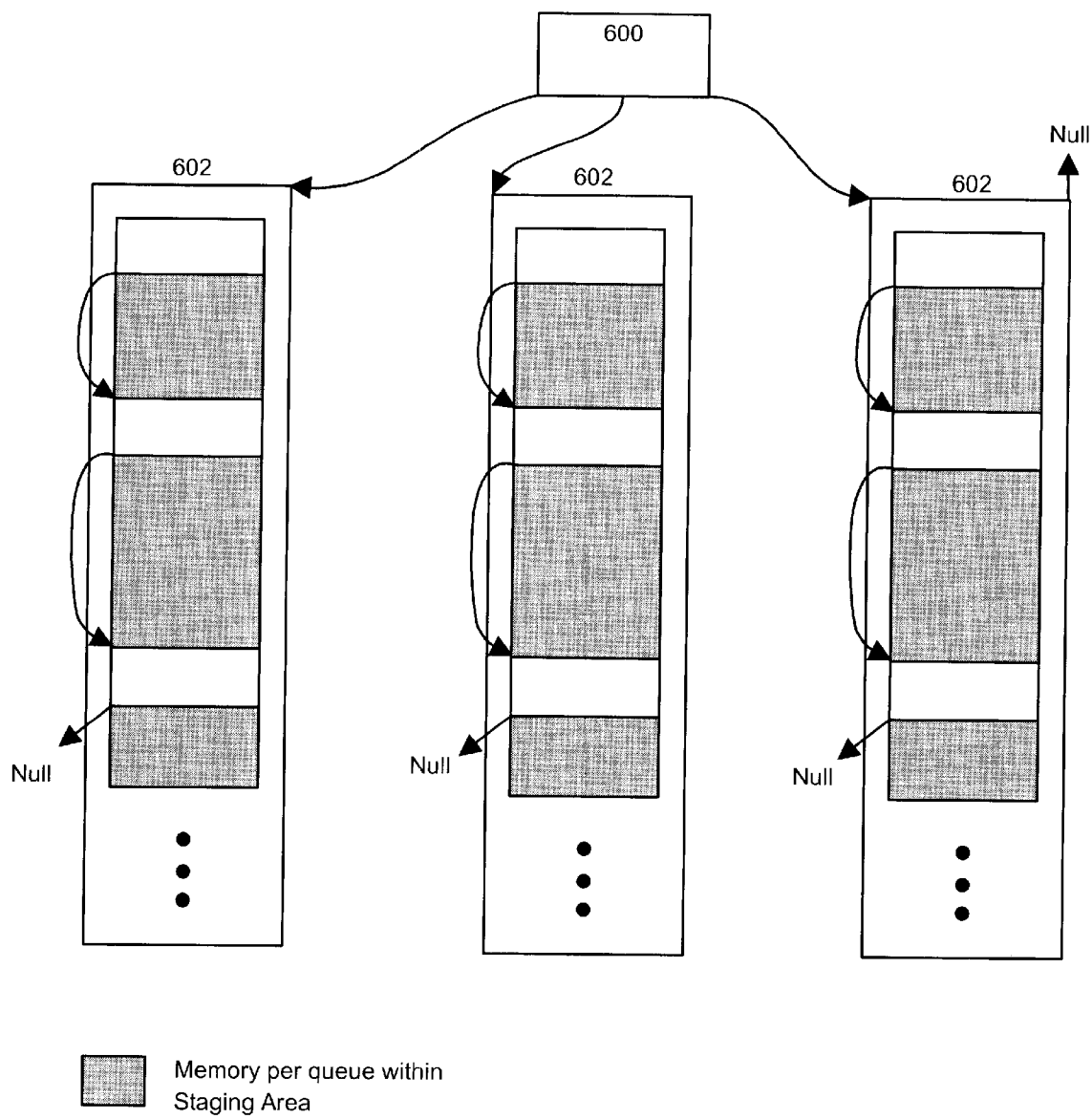
FIG. 6 is a schematic representation of the tables used by the FIQS memory manager to manage the staging areas shown in FIG. 5.

The staging area memory manager 402 is responsible for keeping track of all IO staging areas in shared memory 500, as well as for managing the allocation of memory within a particular staging area. Each of these functions is performed through tables which act as linked lists, thereby allowing for staging areas to be dynamically allocated and deallocated. FIG. 6 is a block diagram of the two different tables used by the memory manager 402, specifically the Staging Area Table 600 and the Staging Area Allocation Table 602. There is one Staging Area Allocation Table 602 for each IOP 106 packlet. As illustrated in FIG. 6, the Staging Area Table 600 provides a means of organizing all allocated IO staging areas within shared memory 500, where an IO staging area is a contiguous block of store that was set aside in shared memory 500 for a specific IOP packlet when requested by FIQS of the operating system. The Staging Area Table 600 uses a linked list of Staging Area Allocation Tables 602 to manage the number of IO staging areas. For a particular staging area, memory store is managed by the memory manager 402 by maintaining a linked list of memory allocated for each queue, where this linked list is referred to as the Staging Area Allocation Table 602. These two tables will be discussed in further detail below.

The FIQS Local Responding Agent 404 is responsible for servicing all inter-processor communication messaging requests that arrive at the IOP 106 from the FIQS IO software applications, invoked by the IOP firmware and performed transparently to the applications. The request may be for the LRA 404 to add a FIQS queue for a specific IO service or, alternatively, for the LRA 404 to delete a FIQS queue for a specific IO service.

Figure 7:
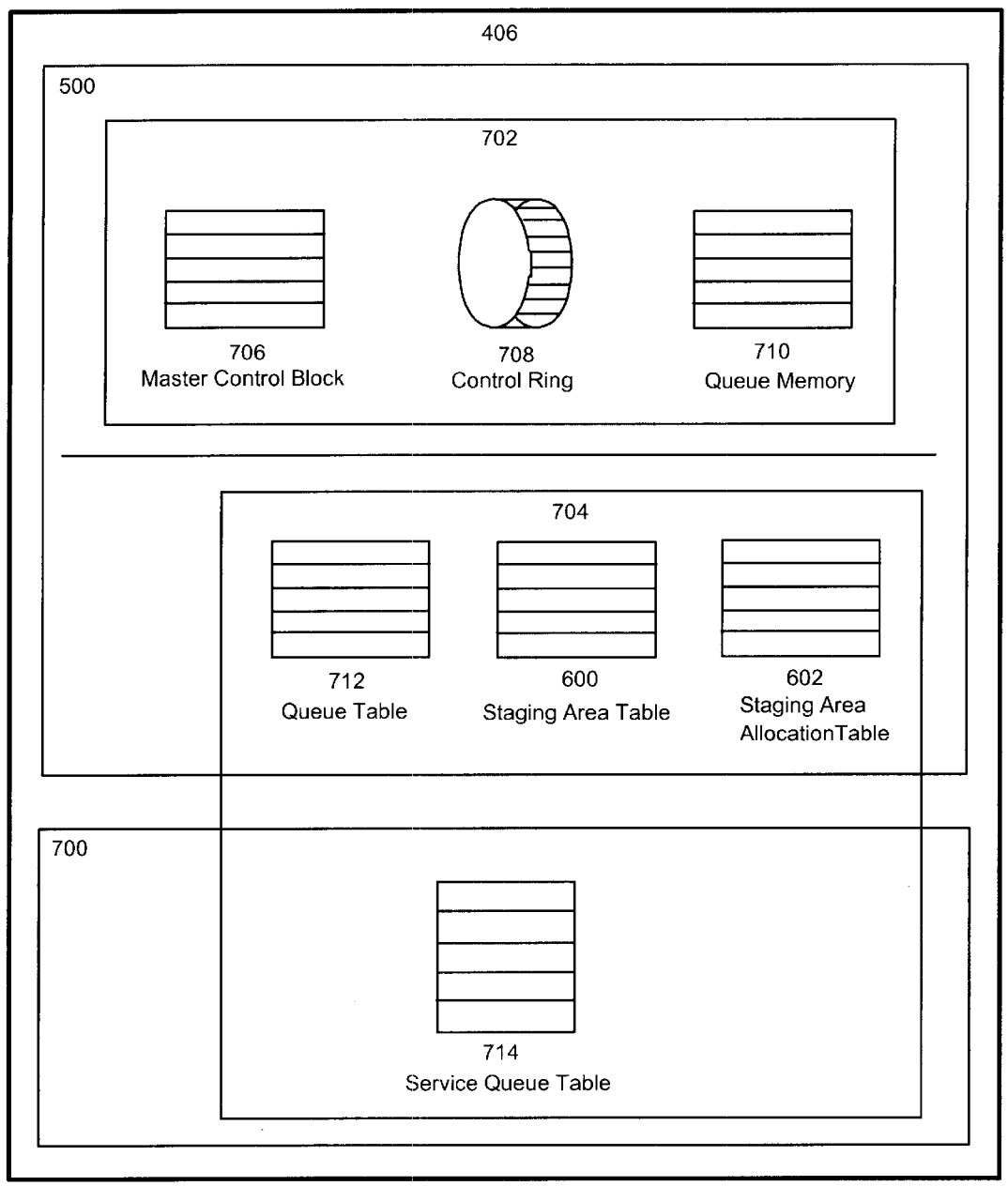
FIG. 7 is a block diagram of the FIQS data structures.

There are two types of FIQS data structures: queue data structures and queue management data structures. FIG. 7 is a block diagram depicting the different data structures 406 required by the FIQS, stored in either shared memory 500 or IOP memory 700. Within shared memory 500, a single FIQS queue is defined by three queue data structures 702, specifically a Master Control Block (MCB) 706, a control ring 708 and queue memory 710.

QUEUE MEMORY 710

The actual data stored on the queue is stored in a queue memory 710, allocated into multiple data buffers. A data buffer may be either fixed, whereby each element of the queue has an associated data buffer of a predefined size, or a variable, whereby one large contiguous block of memory is used by all queue elements and allows each queue element to hold variable size data. Since data buffers are well known to those skilled in the art and have been well documented, they will not be described in any further detail.

CONTROL RING 708

Figure 8:
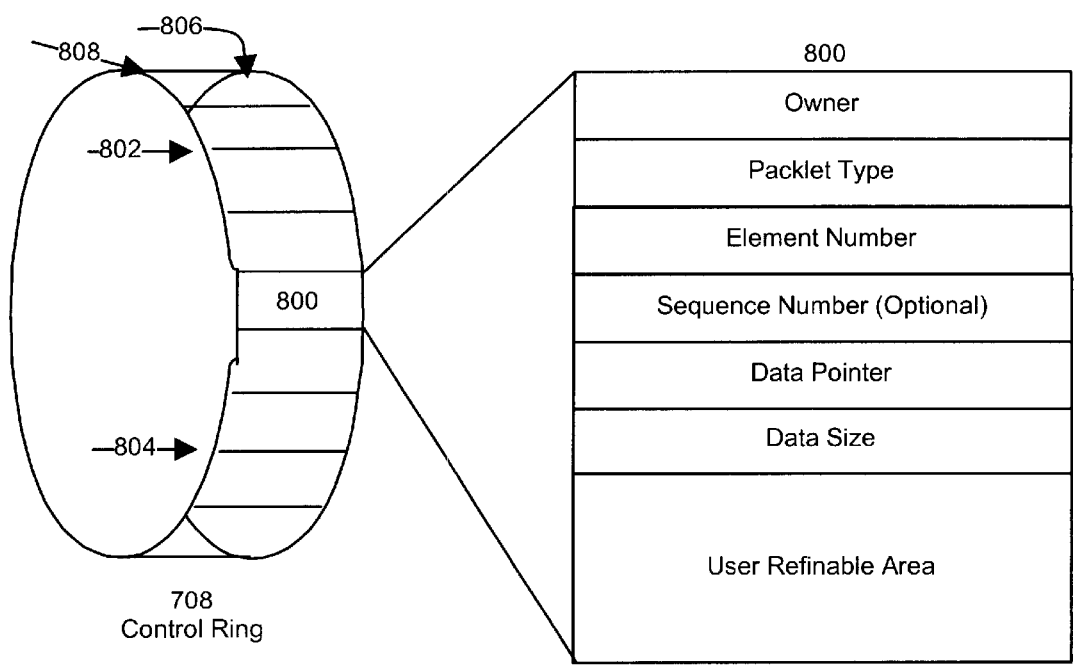
FIG. 8 is a schematic representation of the FIQS control ring shown in FIG. 7.

The actual queue is best represented by its control ring 708, which is a group of sequential descriptors storing information about each element in the queue. FIG. 8 is a representation of the control ring 708, where the number of elements in the control ring indicates the actual size of the queue. This information is provisioned by the application when the queue is created and is stored in the MCB 706 for the queue. Access to the control ring 708 is managed by the read 802 and write 804 pointers. Read pointer 802 contains the location of the next element in the control ring 708 that contains a message. This value is updated by the dequeuer and is stored in the MCB 706. Write pointer 804 contains the location of the next available control ring element that the writer may use to store a message. This pointer is also stored in the MCB 706, but updated by the enqueuer. Wrap-around to the start of the ring is managed by comparing the write pointer 804 to the end of the ring pointer 808. The start and end of the ring pointers 806 and 808 are further specified in the MCB 706. Overflow is managed by comparing the read and write pointers.

Each element, also referred to as descriptor, for example the descriptor for queue element 800, contains several fields containing different types of information about the associated queue element, as described below.

Owner: The owner field is used to identify whether the element is empty, full, or in the process of being dequeued by an IO service.

Packlet Type: This field identifies the packlet associated with this queue, for example SCSI or OC-3. This information is redundant and constant in each record. This constant value provides the packlet with a means to verify that access to the queue is correct (since this field is never updated, a change would suggest a queue corruption).

Element Number: The element number is used to uniquely identify each element or descriptor in the queue. This provides the ability for FIQS to search for queue elements in the even to a discard request by an application. The element numbers are created at initialization time and are constant.

Sequence Number: This field contains a sequence number for two receive queues configured as a virtual queue. (OPTIONAL)

Data Pointer: This field contains a pointer to a message in the queue element data buffer. For a queue with variable data buffers, this field is variable and is updated by the enqueue interface after the message has been stored. For a queue with fixed data buffers, this field is always constant and is configured when the queue is initially created to always point to the same data buffer.

Data Size: This field contains the size of the message stored in the queue element data buffer. For a queue with variable size data buffers, this field is variable and is updated by the enqueue interface after the data is stored. For a queue with fixed data buffers, this field is constant for all elements in the queue.

User Refinable Area: This area is available to the application to refine. By using this area, the application is not forced to include application specific control information as part of the message. This saves one level of indirection.

MASTER CONTROL BLOCK 706

Figure 9:
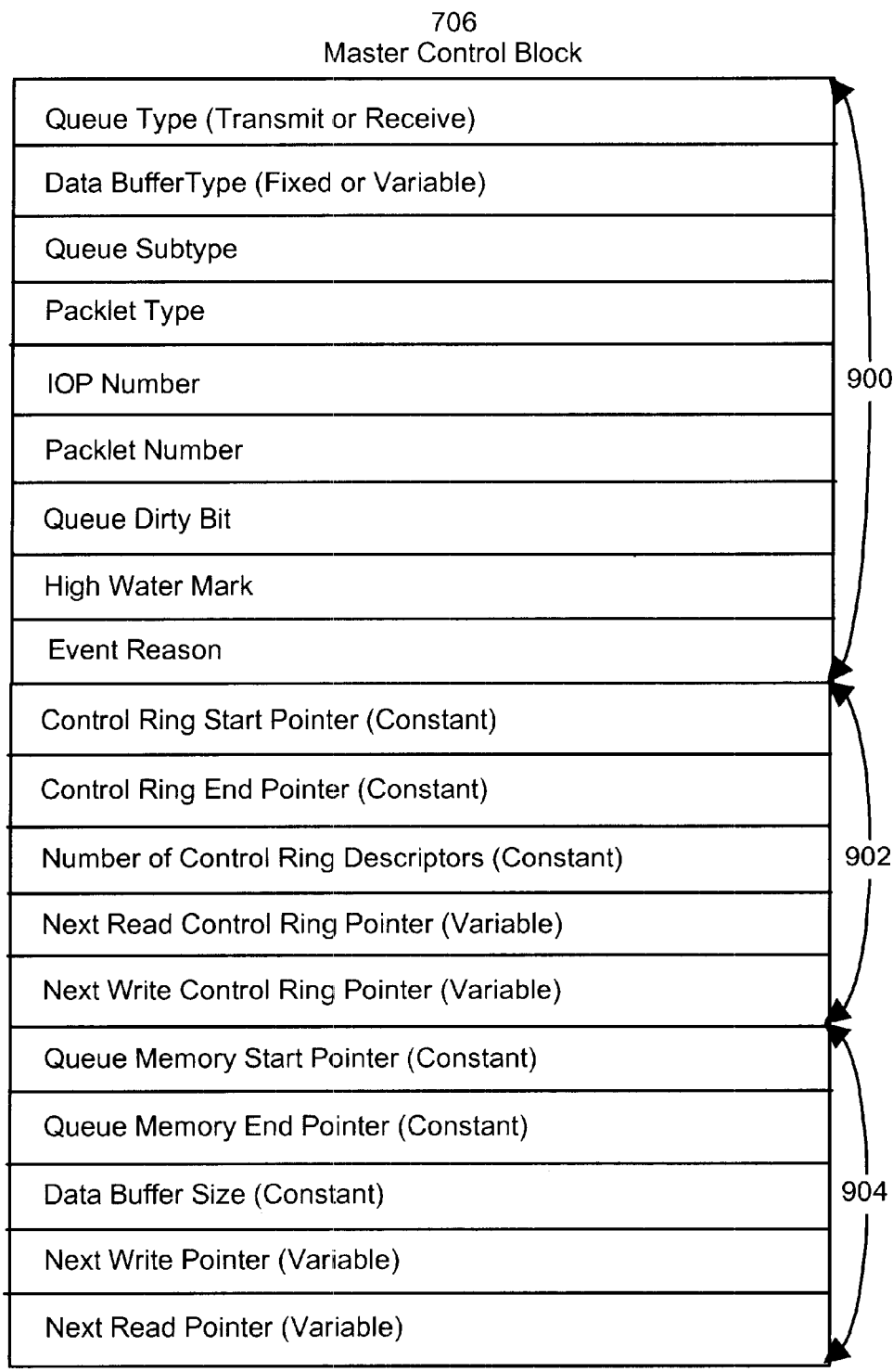
FIG. 9 is a schematic representation of the FIQS Master Control Block (MCB) shown in FIG. 7.

Each queue has an associated Master Control Block (MCE) 706. The MCB 706 contains all of the necessary information to describe the control ring 708 and the queue memory 710, and is used by FIQS software and firmware interfaces. FIG. 9 illustrates a simplified block diagram of the MCB 706, where the block is broken up into three areas, specifically areas 900, 902 and 904. The first area 900 is used to describe some generic qualities about the queue, the second area 902 is used to store control ring information and the third area 904 is used for queue memory information within each of these areas, several fields are used to store different types of information, as described below.

General Queue Information 900

Queue Type: This field indicates whether the queue is a receive or transmit queue. This value is constant and is setup when the queue is provisioned by the application.

Data Buffer Type: This field describes whether the queue has a fixed or variable data buffer type.

Queue Subtype: This field characterizes a transmit queue as either blocking or non-blocking.

Packlet Type: The packlet type describes the packlet which is using the queue and is provisioned by the application when the queue is created.

IOP Number: This field indicates which IOP may access the queue. The value stored is the slot ID of the IOP. This value is constant and is provisioned by the application when the queue is created.

Packlet Number: This field describes which packlet on the IOP may access the queue. This value consists in a packlet number, and is provisioned by the application when the queue is created.

Queue Dirty Bit: The dirty bit provides a mechanism to identify if the queue has had any new data stored since it was last serviced. This allows the dequeuing interface to simply search a dirty bit to determine if there is work to do When the queue is emptied, the dirty bit is cleared by the dequeuing interface. This is only valid for a receive queue.

High Water Mark: This field indicates the maximum number of messages stored in the queue at any one time. This information is useful to engineer the queue size.

Event Reason: This field is used by queue event reporting to notify the application that an event was reported by the firmware service. The application is notified by a return code during the next enqueue/dequeue. To read the event code, the application invokes a procedure call. This same procedure clears the event reason.

Control Ring Information 902

Control Ring Start Pointer: This field contains a pointer to the beginning address in shared memory 500 where the first control ring 708 descriptor is located. This address must be word aligned and is constant. This value is established when the control ring 708 is allocated;

Control Ring End Pointer: This field contains a pointer to the ending address in shared memory 500 where the last control ring 708 descriptor is located. This address must be word aligned and is constant. This value is established when the control ring 708 is allocated.

Number of Control Ring Descriptors: This field indicates the size of the control ring 708 by describing the number of descriptors available. This reflects on the maximum number of messages a queue may hold. This field is also constant and is specified by the application during queue creation.

Next Read Control Pointer: This field contains a pointer to the next available descriptor that describes a valid message. This value is variable and is updated by the reader after the message is read. The pointer must be word aligned and must be located on a separate memory line from the Next Write Control Pointer. This allows applications and IO firmware to use the queue at the same time.

Next Write Control Pointer: This field contains a pointer to the next available empty descriptor that may be used to describe a message. This value is variable and is updated by the writer after the message is written. The pointer must be word aligned and must be located on a separate memory line from the Next Read Control Pointer. This allows applications and IO firmware to use the queue at the same time.

Queue Memory Information 904

Queue Memory Start Pointer: This field contains a pointer to the address in shared memory 500 where the queue memory 710 begins This address must be word aligned and is constant. This value is established when the queue memory 710 is allocated and is only valid for a queue with a variable size data buffer.

Queue Memory End Pointer: This field contains a pointer to the address in shared memory 500 where the queue memory 710 ends. This address must be word aligned and is constant. This value is established when the queue memory 710 is allocated and is only valid for a queue with a variable size data buffer.

Data Buffer Size: This field contains the size of the queue data buffer. The application must specify this size at queue creation time. This value is constant.

Next Write Pointer: This field contains a pointer to the address within the queue memory 710 where the next message may be stored. This value is variable and is updated by the writer after the message is written. Like all other pointers in shared memory 500, this value must be word aligned. This field is only valid for a queue with a variable size data buffer.

Next Read Pointer: This field contains a pointer to the address within the queue memory 710 where the oldest message is stored. This is to ensure that the buffer is not overwritten. This value is variable and is updated by the reader. Like all other pointers in shared memory 500, this value must be word aligned. This field is only valid for a queue with a variable size data buffer.

In order to manage these queue data structures 702, several management data structures 704 are employed. All queue management data structures are used internally by FIQS interfaces. The Queue Table 712, Staging Area Table 600 and Staging Area Allocation Table 602 are all stored in shared memory 500, while the Service Queue Table 714 is stored in IOP memory 700.

QUEUE TABLE 712

Each queue that is created by the FIQS is mapped against a Queue Identifier (QID). This value is used by FIQS interfaces to access a specific queue. The Queue Table comprises five different fields, as described below.

Queue ID: The queue ID serves as a reference key for a queue. This value is used by all FIQS interfaces in order to index to the proper queue.

Service ID: The service ID indicates the packlet firmware service that is to service the queue.

MCB Pointer: The Master Control Block pointer is used to indicate where the queue is located in shared memory 500.

Memory Block Pointer: The memory block pointer points to a block which contains the address of the service firmware that is to service the queue.

Notification Procedure Pointer: This is a pointer to a procedure that FIQS can call to notify an application when work is required for a receive queue.

The Staging Area Table 600

The staging Area Table 600 is provided by FIQS in order to manage a mapping between IOPs and their assigned IO staging areas in shared memory 500, as described above. More specifically, the Staging Area Table 600 serves as a look-up table, so that FIQS can create queues for specified IOPs in the appropriate staging area, and comprises six different fields per queue entry, as described below.

Service Type: This field indicates the IO service that is using the queue.

IOP Number: This field indicates which IOP may access the queue. The value stored is the slot ID of the IOP. This value is constant and is provisioned by the application when the queue is created.

Packlet Number: This field describes which packlet on the IOP may access the queue. This value consists of a packlet number, and is provisioned by the application when the queue is created.

Staging Area Base Address: This field indicates the base address for the staging area for the specific packlet.

Staging Area Size: This field indicates the size of the staging area. This information is used by the FIQS memory manager to allocate and deallocate queues.

Head Pointer: This field contains the address of the head of a Staging Area Allocation Table, where this table is a linked list of memory allocated for each active queue within the staging area.

STAGIN AREA ALLOCATION TABLE 602

As described above, an IO staging area is a contiguous block of storage space that is set aside in shared memory 500 when requested by FIQS, and assigned to a particular IOP packlet. The Staging Area Allocation Table 602 is a sub-table of the Staging Area Table 600, used to manage the shared memory within a particular staging area, and consists in a linked list of memory allocated for each queue within the staging area.

The Service QUEUE TABLE 714

The Service Queue Table 714, stored in IOP memory 700, is a firmware queue table which provides a means to organize queues from a firmware perspective. It is used only by firmware interfaces to understand where queues are stored in shared memory 500. Specifically, the table lists all queues that have been created for servicing by a packlet firmware service. The Service Queue Table 714 comprises five different fields per queue entry, as described below.

Service ID: The service ID indicates the packlet firmware service that is to service the queue.

Queue ID: The queue ID serves as a reference key for a queue. This value is used by all FIQS interfaces in order to index to the proper queue.

Queue Type: This field indicates whether the queue is a receive or transmit queue. This value is constant and is setup when the queue is provisioned by the application.

Queue Info: This field indicates the size of the queue.

MCB Pointer: The Master Control Block pointer is used to indicate where the queue is located in shared memory 500.

The FIQS data structures described above, used to implement and manage a queue for the FIQS, provide the functionality for an IO software application to customize a FIQS IO queue according to several different characteristics, as described below.

1. QUEUE TYPE

Figure 10:
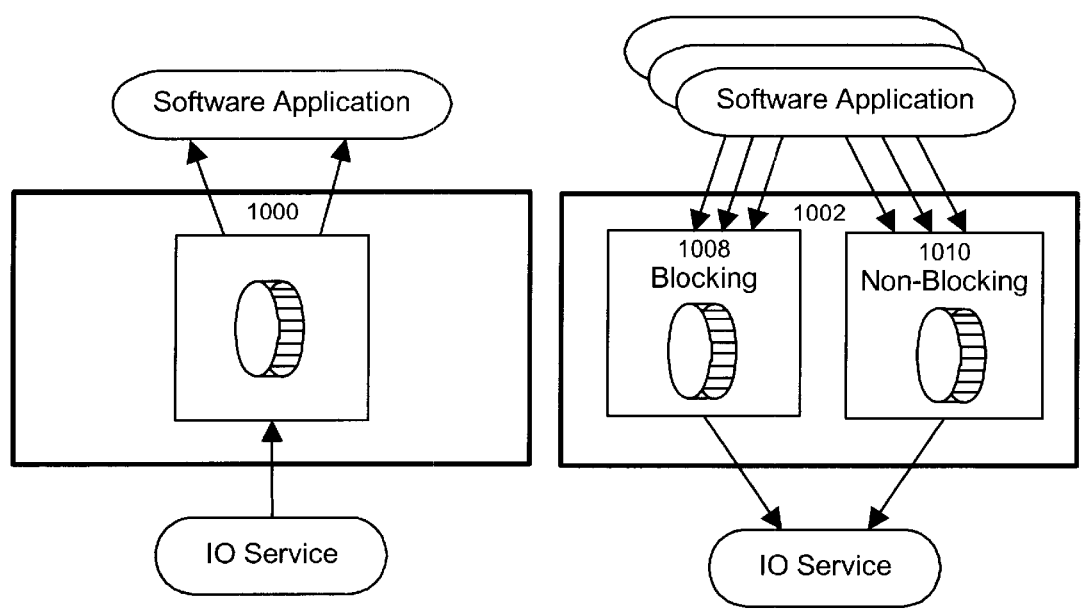
FIG. 10 is a schematic representation of the different types of FIQS queues.

Queues are characterized by the direction of data flow through the queue. Traditionally, there are two types of queues from the perspective of an application: those that receive information and those that transmit information. FIG. 10 is a block diagram illustrating the different types of queues available to the FIQS. The FIQS receive queues 1000, provide a mechanism for receiving information from one or more IO services and storing this information until it is retrieved by a software application process using a FIQS interface. Such receive queues are well known to those skilled in the art and have been well documented, and therefore will not be described in further detail.

FIQS transmit queues 1002 are designed such that they receive data from multiple software applications and store it until it is retrieved by a single IO service. Multiple software application processes can enqueue to a transmit queue simultaneously by using a FIQS interface. The interface ensures that each process owns their own element in the queue. When an application attempts to enqueue, the FIQS interface has to first gain ownership of the queue write pointer. Following this, the FIQS interface reads the queue element pointed to by the write pointer and takes ownership of the element. It then increments the write pointer and gives up ownership which allows other applications to get their own queue elements. Therefore, different IO software applications may enqueue data at their own speed without significantly impacting other IO software applications.

Note that a process can take ownership of a line of shared memory and hold it for a short period of time. The process may Acommit@ the line, thus giving up ownership of the line of memory, without necessarily having completed an entire software task. The multiprocessor system memory operates on a line size equal to the size of the processor cache line, in a specific example 32 bytes. In order to read or write a line of shared memory, a process must claim ownership of this line.

Figure 11:
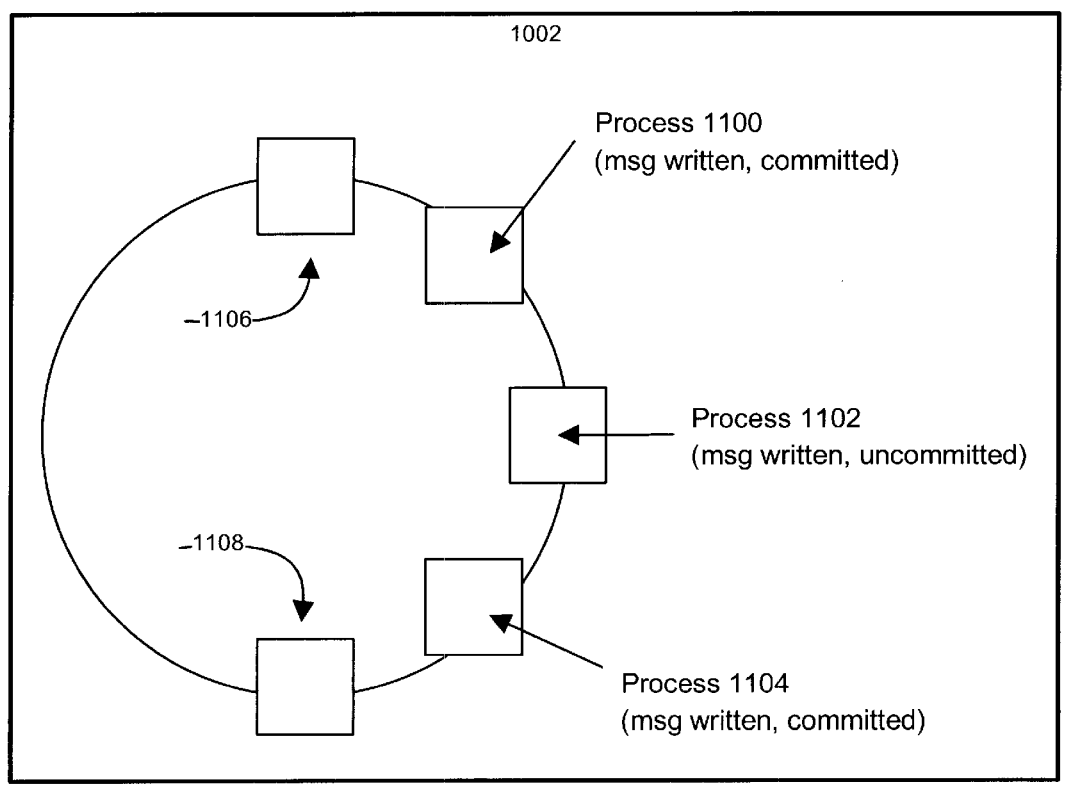
FIG. 11 is a block diagram of a FIQS transmit queue, in accordance with the present invention.

FIG. 11 illustrates how a transmit queue 1002 works, where this transmit queue can have multiple processes accessing it simultaneously, for example processes 1100, 1102 and 1104. In this example, process 1100 gets sent first, followed by process 1102 and process 1104. To get access to the queue, each process has to first get ownership of the write pointer 1108 for the queue. Once the process gets the write pointer, it gets access to a descriptor in the queue, in other words a queue element. The process then saves the write pointer address, increments the write pointer 1108 to point to the next element in the queue, and line commits the write pointer 1108 so that other processes can gain ownership of the write pointer 1108. In the meantime, an IO service, which is monitoring the queue through a read pointer 1106, is following the movement of the write pointer and dequeuing any enqueued elements. However, an element is only ever considered enqueued if the process has written and committed the data. This introduces a situation whereby a process may temporarily delay to give up ownership of an element and block the movement of the read pointer 1106. In order to ensure that a process can not delay giving up ownership forever, an application process is given a certain amount of time, after which it either must commit and give up ownership of the queue element or else is rolled-back. This amount of time can be selectively set in accordance with the specific application. Such is the case of process 1102 in FIG. 11. It gets access to a queue element and writes its message, but delays giving up ownership. The read pointer 1106 would therefore become temporarily blocked after dequeuing the data for process 1100.

In order to tackle this situation, FIQS introduces two types of transmit queues 1002: blocking 1008 and non-blocking 1010. The example described above for process 1102 is one that characterizes a blocking queue. Specifically, the IO service is not able to skip over unowned elements in the FIQS queue. The IO service is therefore forced to wait for the process to give up ownership through committing or roll-back if the time period during which the blockage can be maintained has elapsed. The advantage of FIQS blocking queues 1008 is that message sequencing is ensured for a single application process executing on a single PE and between multiple application processes executing on multiple PEs. In other words, messages are dequeued following the same order with which they were enqueued.

A non-blocking queue 1010 is a transmit queue which does not allow a single process to block the dequeue operation of the queue. The IO service bypasses owned elements in the queue and dequeues only unowned elements that contain valid data, thereby eliminating the constraint of blocking queues. The bypassed elements are eventually dequeud by the IO service once they become unowned. Referring to the example of FIG. 11, this would mean that the IO service skips over the process 1102 element in the queue and services the process 1104 element. The read pointer 1106 then waits until the write pointer 1108 is incremented around the queue past the process 1102 element (the write pointer 1108 skips over it), at which point the read pointer 1106 can dequeue the process 1102 message if it has been committed. Note that non-blocking queues 1010 ensure message sequencing only for a single process during a time-slice. They do not ensure message sequencing between multiple processes on different PEs.

2. APPLICATION QUEUE ACCESS

Queue access defines the approach used to transfer data between the FIQS and the IO software applications. The FIQS offers three basic approaches, specifically the copy based approach, the FIQS based approach and the application based approach.

Copy Based

With copy based access, both the software applications and the FIQS contain their own separate data buffers, inaccessible by each other. To enqueue or dequeue, a copy must be performed between the two data buffers. This is the default access mechanism for FIQS. In order to enqueue, the IO software application makes a procedure call to FIQS including a reference to the data buffer which contains the message it wishes to enqueue to the FIQS, along with the size of the message. FIQS then copies the message out of the applications data buffer and into its own data buffer on the queue. In order to dequeue, the IO software application makes a procedure call to FIQS including a reference to its empty data buffer. FIQS then copies the data out of its own data buffer and into the applications data buffer. The advantage of copy based access is that after copying and committing, the FIQS and the IO software application are free to manipulate their own buffers without fear of corrupting each others buffers.

FIQS Based

FIQS access describes an approach whereby the IO software application does not have any data buffers and relies on data buffers provided by the FIQS. In order to enqueue, the IO software application makes a procedure call to FIQS to get a reference to one of FIQS=empty data buffers. The application then copies its data into the empty data buffer and enqueues the reference to the data buffer back into the queue via a separate procedure call. To complete the transaction, the application must commit. In order to dequeue, the IO software application communicates to FIQS via a procedure call. FIQS then returns a reference to a data buffer that contains the message. The application is then free to use the buffer and work on the message contained in the data buffer. When the application is through with the data buffer, it must return the FIQS data reference via a separate procedure call to FIQS. FIQS based access is efficient since one less copy is required; however, in the case of enqueuing, FIQS must use fixed data buffers which must be provisioned large enough to contain the largest message that an application might enqueue, implying an inefficient use of memory if the majority of the messages are small.

Application Based

Application based access is available for enqueuing only.

With this approach, IO software applications make a procedure call to FIQS including a reference to one of its data buffers. FIQS then enqueues this reference onto the queue. The packlet service then retrieves the data directly from the applications data buffer by using the enqueued reference. The IO software application is required to poll the FIQS with a procedure call in order to determine when the buffer is free. This approach is advantageous because the IO software application is free to build messages outside of FIQS and no copy is required since only a reference is stored on the data buffer.

3. QUEUE SIZE

Queue size describes the ability for an IO software application to provision the number of elements in the queue as well as the size of the data buffers in each queue element. For all queue types, the application can specify the number of elements; however, certain queue types imply the use of different data buffers. For example, non-blocking transmit queues require fixed data buffers to manage holes that can be created when elements are skipped over by the dequeuer. With fixed data buffers, the IO software application must specify a size to accommodate the largest message that the application supports. With variable size data buffers, each data buffer has an associated size.

4. QUEUE EVENT REPORTING

FIQS queue event reporting is a mechanism which allows a firmware service that is accessing a queue to report events directly to the IO software application. Event reporting is generic in that FIQS does not know what type of information is being reported, but rather simply acts as a pipe for the information.

5. QUEUE ELEMENT IDENTIFICATION

All enqueue operations return the queue element identifier to the IO software application. This allows the application to specify that a specific element be discarded.

6. QUEUE/SERVICE COMMUNICATION

This feature of FIQS provides a generic method for an IO software application to pass specific information about a queue down to an IO service which is responsible for servicing the queue. This information is transparent to the FIQS and simply passed through to the IO service.

7. QUEUE IDENTIFICATION

Queue identification allows an IO software application or IO service to reference a queue through a unique Queue ID (QID). The QID serves as a look-up for FIQS to locate the specific queue. The QID is passed back to the application when the queue is created. It is the responsibility of the application to manage who has access to the queue by sharing the QID or keeping it private.

8. QUEUE METRICS

Queue metrics allow IO software applications to query a queue to see the high water mark for the queue, where this mark indicates the most messages that have been enqueued into a transmit or receive queue during the existence of the queue.

9. QUEUE NOTIFICATION

Queue notification describes the method that FIQS uses to notify an IO software application that a message has been enqueued into a receive queue for the particular IO software application. The method is based on the use of the event action register which is located on each IOP. This event action register serves as a bulletin board of events which can include: FIQS events, IOP events and IOP faults. Queue notification only uses the FIQS events field of the register, which is divided into multiple application identifiers. An application ID indicates which application is responsible for servicing this queue, for example a DMS Messaging Data Link Layer for an OC-3 queue.

When an IO software application creates a queue for a specific packlet type, it is assigned an application ID. FIQS internally maps an application ID in the event action register to a specific packlet type. Therefore, each queue created by an IO software application has an associated application ID. When a message is received by an IO service, it stores the message into the queue, updates the queue dirty bit and updates the appropriate field of the event action register. Note that the application ID is passed down to the IO service when the queue is created. Each IOP maintains an Event Notification Register, used to maintain event bits which may be set and cleared. The Event Notification Register on each IOP is polled regularly. If a FIQS event bit is set, the event notification process invokes a FIQS procedure, responsible for taking the application ID and looking up a corresponding notification procedure for that queue. The FIQS interface then invokes the notification procedure that the IO software application bound in during queue creation.

10. FAULT HANDLING

Fault handling describes the ability for FIQS to recognize and report faults in the queuing system. In order to do this, FIQS forces all IO software applications to have a valid queue ID when accessing the queue. Since the only one who knows about the queue is the application, it controls who can access it. Further, FIQS provides for a field within the queue control data structure what is never written to except at initialization time. A corruption of this field indicates a bad pointer and queue corruption is suspected. In all cases, queue errors are reported back to the IO software application.

Figure 12:
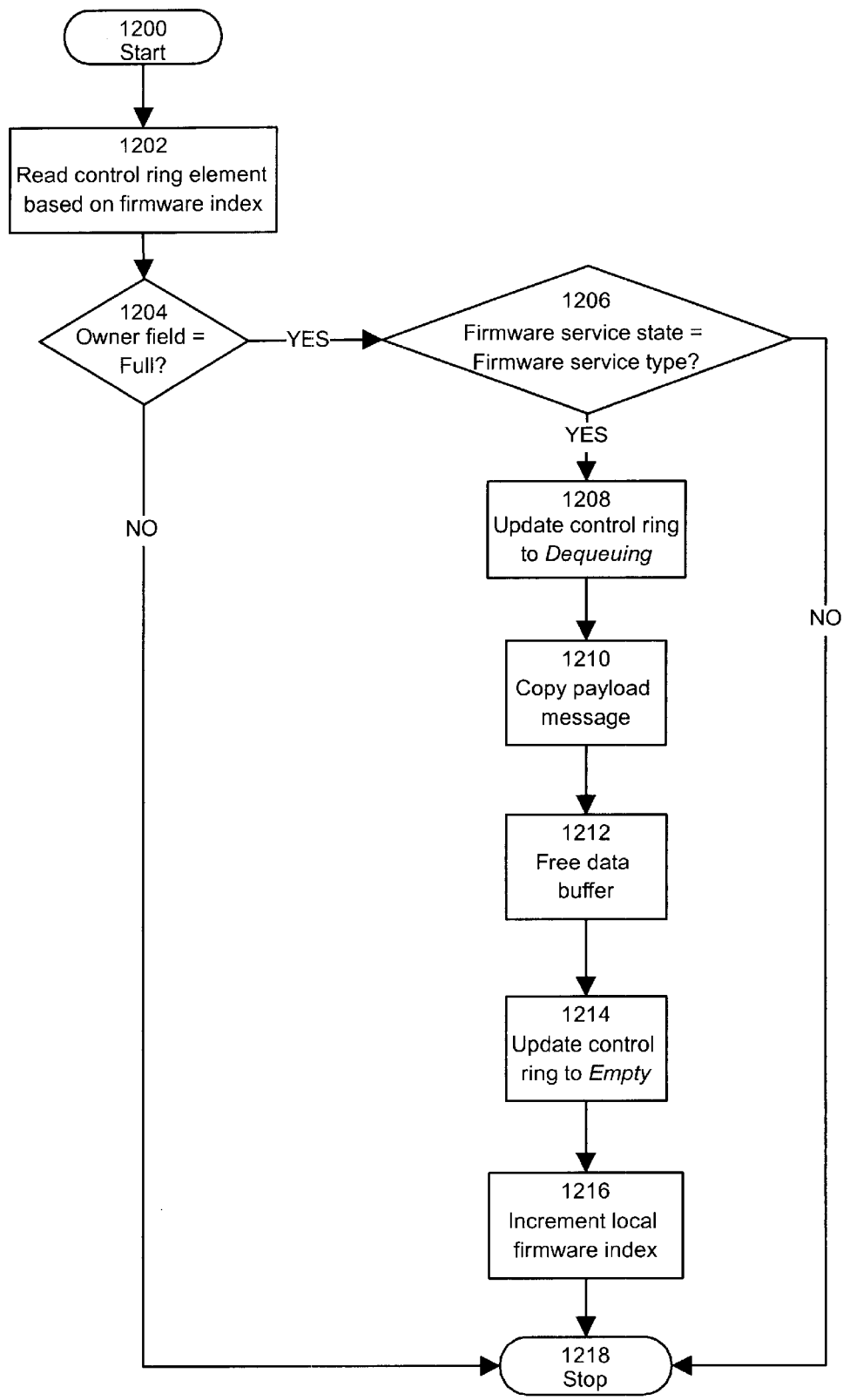
FIG. 12 is a flow chart illustrating an operation of the FIQS program element, specifically the FIQS operation of dequeuing from a transmit queue.

Although FIQS supports a multitude of different operations in order to offer a flexible messaging system between IO service firmware and IO software applications, there are four operations which are essential to, and form the foundation of, FIQS. Specifically, these operations consist in: dequeuing from a transmit queue, dequeuing from a receive queue, enqueuing to a transmit queue and enqueuing to a receive queue. FIG. 12 is a flowchart illustrating an example of the steps followed by the FIQS program element, as executed by IOP firmware, when dequeuing from a transmit queue. At step 1202, the program element calculates the address of the next control ring entry to dequeue from and reads the entire control ring descriptor at this address. The address is calculated by adding the control ring start address and the firmware control index (read pointer). Both of these local variables are initialized when the queue is enabled. At step 1204, the ownership of the control ring entry is examined, specifically a status bit maintained in shared memory. If there is already ownership by a process, the dequeuing process terminates. If there is no ownership, the owner field of the control ring descriptor is examined. If the owner field state is Full, the dequeuing process continues, otherwise the process is terminated since there is nothing to dequeue. At step 1206, the firmware service state of the descriptor is examined. If the firmware service state is not equivalent to the firmware service type performing the dequeue, the dequeue request fails. Next, the owner field of the control ring descriptor is updated to indicate that the message is being dequeued at step 1208. At step 1210, the payload message is copied into a local buffer, using the payload messages start address and the payload message size. At step 1212, the data buffer which previously contained the payload message is freed. To accomplish this, the payload message use pointer is de-referenced and set to a nil value. The owner field of the control ring descriptor is then updated to Empty to indicate that the message has been dequeued at step 1214. Finally, at step 1216, the local firmware index (read pointer) is incremented so that it points to the next item in the queue.

Figure 13:
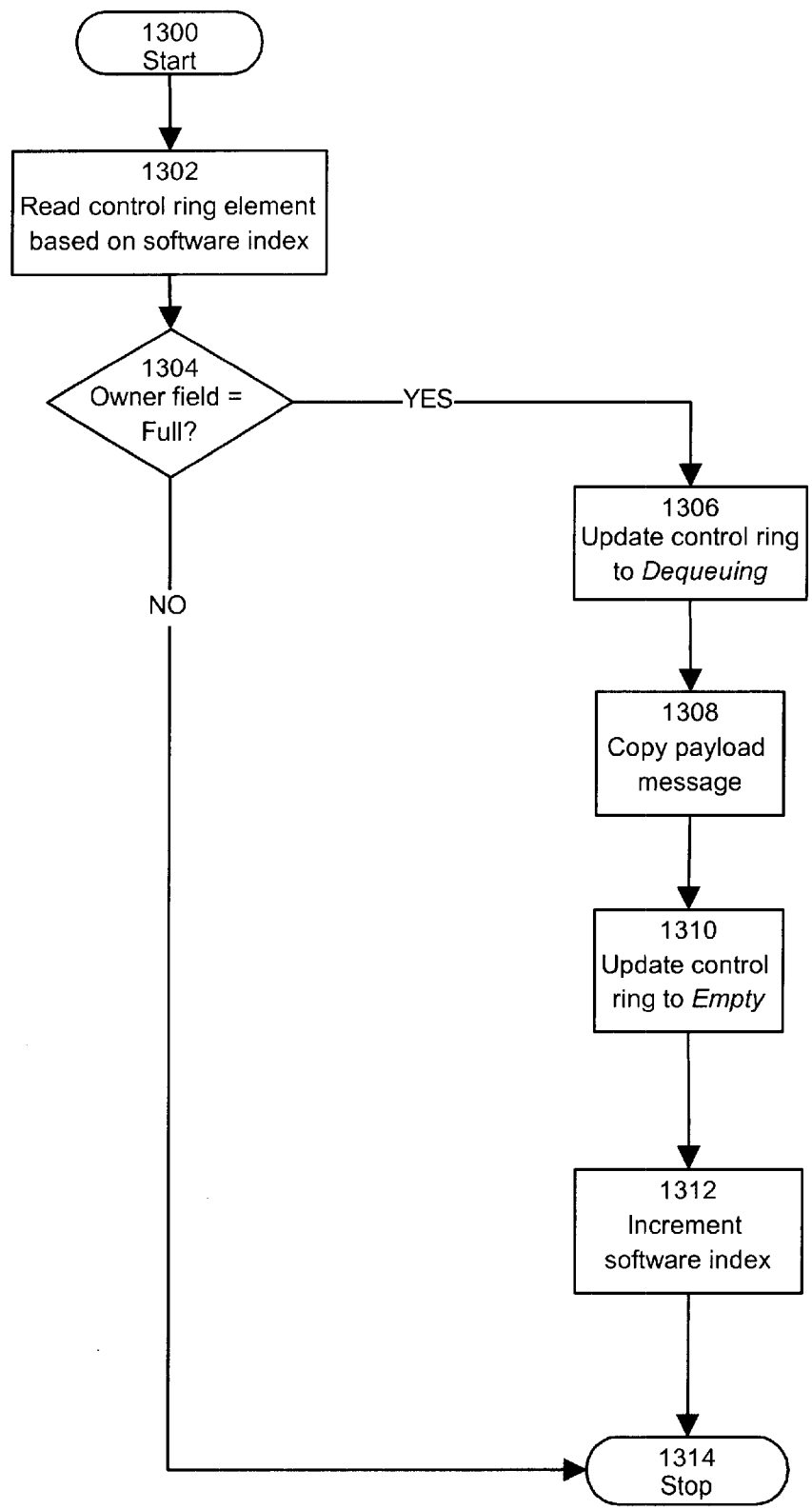
FIG. 13 is a flow chart illustrating an operation of the FIQs program element, specifically the FIQS operation of dequeuing from a receive queue.

FIG. 13 is a flowchart illustrating an example of the steps followed by the FIQS program element, as executed by a PE, when dequeuing from a receive queue. Mutual exclusion between the multiple PEs is required in order to prevent different PEs from accessing the same queue element at the same time. This mutual exclusion is ensured with the use of a semaphore, generated by the ownership of a particular line of memory. At step 1302, the program element claims ownership of the pointer to the control ring, calculates the address of the next control ring entry to dequeue from and reads the entire control ring descriptor at this address. When claiming ownership of the pointer to the control ring, the program element generates a semaphore which blocks any other PE from claiming this pointer. The address of the next control ring entry is calculated by adding the control ring start address and the software control index (read pointer). Both of these variables are initialized when the queue is enabled. At step 1304, the owner field of the control ring descriptor is examined. If the owner field state is Full, the dequeuing process continues, otherwise the process is terminated since there is nothing to dequeue. Next, at step 1306, the owner field of the control ring descriptor is updated to indicate that the message is being dequeued, and the semaphore blocking the control ring pointer is released. At step 1308, the payload message is copied into a local buffer, using the payload messages start address and the payload message size. The owner field of the control ring descriptor is then updated to Empty, to indicate that the message has been dequeued at step 1310. Finally, at step 1312, the software index (read pointer) is incremented so that it points to the next item in the queue.

Figure 14:
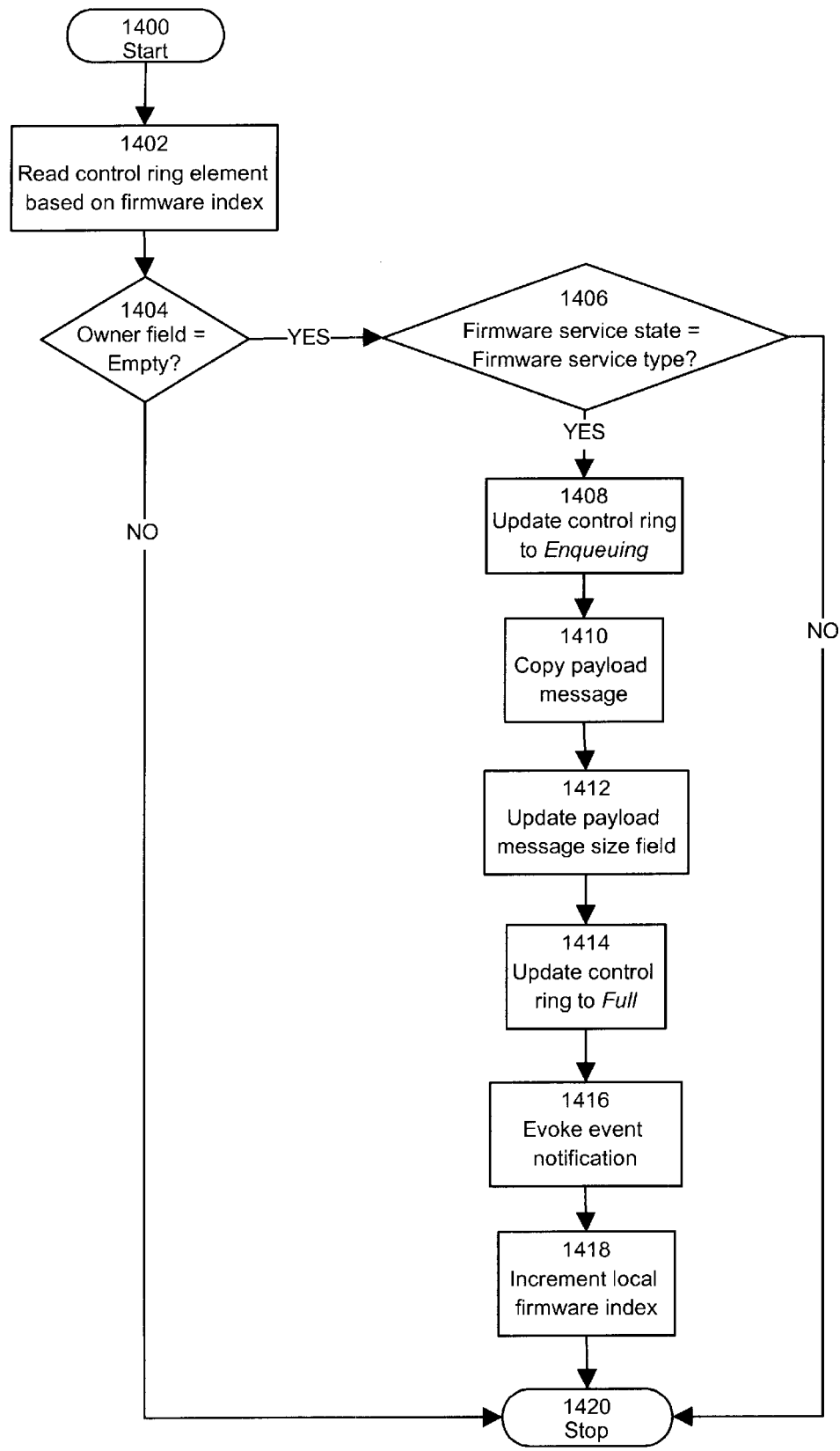
FIG. 14 is a flow chart illustrating an operation of the FIQS program element, specifically the FIQS operation of enqueuing to a receive queue.

FIG. 14 is a flowchart illustrating an example of the steps followed by the FIQS program element, as executed by IOP firmware, when enqueuing to a receive queue. At step 1402, the program element calculates the address of the next control ring entry to enqueue to and reads the entire control ring descriptor at this address. The address is calculated by adding the control ring start address and the firmware control index (write pointer). Both of these local variables are initialized when the queue is enabled. At step 1404, the ownership of the control ring entry is examined, specifically a status bit maintained in shared memory. If there is ownership by a process, the enqueuing process terminates. If there is no ownership, the owner field of the control ring descriptor is examined. If the owner field state is Empty, the enqueuing process continues, otherwise the process is terminated since the queue is full. At step 1406, the firmware service state of the descriptor is examined. If the firmware service state is not equivalent to the firmware service type performing the enqueue, the enqueue request fails. Next, the owner field of the control ring descriptor is updated to indicate that the message is being enqueued at step 1408. At step 1410, the message to be enqueued is copied into the data buffer pointed to by the payload message data buffer start address, ensuring that the message is equal to or smaller than the payload message data buffer size. At step 1412, the payload message size field is updated by writing it into the control ring descriptor. The owner field of the control ring descriptor is then updated by setting the owner field state to Full, at step 1414. At step 1416, event notification is invoked by setting a bit in the Event Notification Register on the IOP. The bit position to set is the hardware event ID field in the MCB. This field should be read during queue enable. Finally, at step 1418, the local firmware index (write pointer) is incremented so that it points to the next item in the queue.

Figure 15:
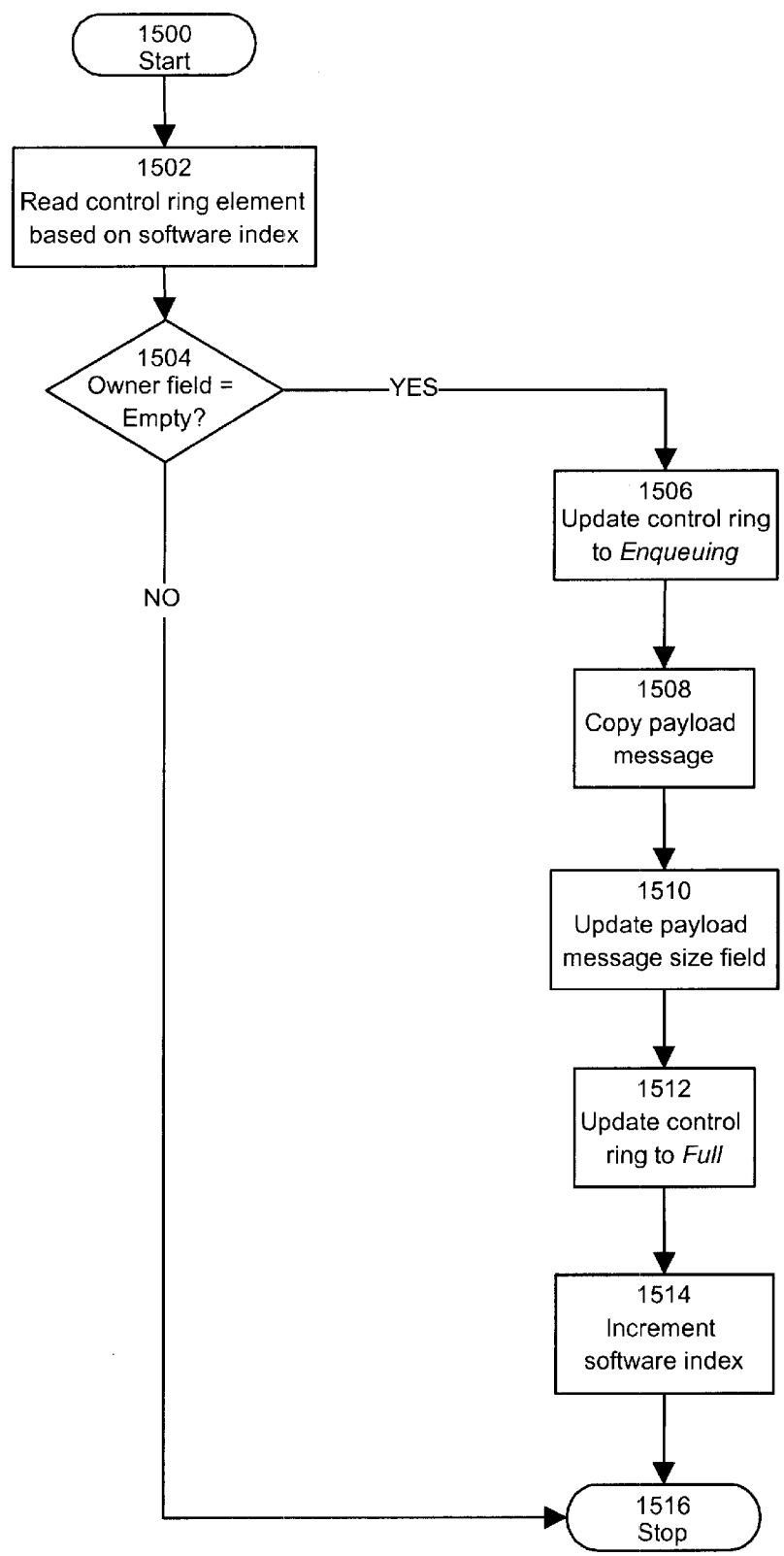
FIG. 15 is a flow chart illustrating an operation of the FIQS program element, specifically the FIQS operation of enqueuing to a transmit queue.

FIG. 15 is a flowchart illustrating an example of the steps followed by the FIQS program element, as executed by a PE, when enqueuing to a transmit queue. Mutual exclusion between the multiple PEs is required in order to prevent different PEs from accessing the same queue element at the same time. This mutual exclusion is ensured with the use of a semaphore, generated by the ownership of a particular line of memory. At step 1502, the program element claims ownership of the pointer to the control ring, calculates the address of the next control ring entry to enqueue to and reads the entire control ring descriptor at this address. When claiming ownership of the pointer to the control ring, the program element generates a semaphore which blocks any other PE from claiming this pointer. The address of the next control ring entry is calculated by adding the control ring start address and the software control index (write pointer). Both of these variables are initialized when the queue is enabled. At step 1504, the ownership of the control ring entry is examined, specifically a status bit maintained in shared memory. If there is already ownership by a process, the enqueuing process terminates. If there is no ownership, the owner field of the control ring descriptor is examined. If the owner field state is Empty, the enqueuing process continues, otherwise the process is terminated since the queue is full. At step 1506, the owner field of the control ring descriptor is updated to indicate that the message is being enqueued, and the semaphore blocking the control ring pointer is released. At step 1508 the message to be enqueued is copied into the data buffer pointed to by the payload message data buffer start address, ensuring that the message is equal to or smaller than the payload message data buffer size. At step 1510, the payload message size field is updated by writing it into the control ring descriptor. The owner field of the control ring descriptor is then updated by setting the owner field state to Full, at step 1512. Finally, at step 1514, the software index (write pointer) is incremented so that it points to the next item in the queue.

The above described process flows may be performed with variations and additional steps, dependent on the FIQS settings in place such as the queue type and the type of queue access, and are also included within the scope of this invention.

Finally, the present invention, known as the Flexible Input-output Queuing System, provides several advantages specific to the interaction between IO service firmware and IO software applications within a multiprocessing environment, including:

the ability for multiple IO software applications, executing as different processes on different PEs, to gain access to a FIQS queue simultaneously or approximately simultaneously, as governed by the semaphore access control to the write and read pointers;

software applications which have gained access to a queue do not impact the throughput of the queue by delaying to give up ownership;

FIQS minimizes the amount of overhead required to access a queue, thus decreasing latency and increasing IO throughput performance;

the queuing system supports multiple queues per IO service;

messages that are received by two unique IOP packlets are presented to PE software applications in the order that they were received;

messages that are sent by a single application process during a time-slice are dequeued in the same order with which they were enqueued.

Note that FIQS does not guarantee that messages received by two software application processes executed by two different PEs will be dequeued in the order that they were received, specifically in the non-blocking versions.

While the present invention has been described in considerable detail with reference to certain preferred embodiments thereof, variations and refinements are possible without departing from the spirit of the invention as have been described throughout the document. Therefore, the scope of the invention should be limited only by the appended claims and their equivalents.

We claim:

1. A queuing system for exchanging data elements between a transactional input/output (IO) system and a non-transactional IO system, said queuing system comprising:

a queue including a plurality of memory slots;

a write pointer for successively designating memory slots of said queue permitting a process of either one of the transactional system and the non-transactional system to access the memory slots for enqueuing data elements thereto;

a read pointer for successively designating memory slots of said queue permitting a process of either one of the transactional system and the non-transactional system to access the memory slots for dequeuing and processing data elements contained therein; and a control functional block operative to control:
  a) ownership of each one of said read and write pointers by a process of either one of the transactional system and the non-transactional system;
  b) ownership of a memory slot of said queue by a process of either one of the transactional system and the non-transactional system;

said queuing system permitting a controllable exchange of data elements between the transactional system and the non-transactional system.

2. A queuing system as defined in claim 1, wherein a process owns a particular memory slot of said queue for a predetermined maximum period of time, whereby upon expiration of the maximum period of time said control functional block forces the process to relinquish ownership of the particular memory slot of said queue.

3. A queuing system as defined in claim 2, wherein when a process is enqueuing a data element to a particular memory slot of said queue, the process owns the particular memory slot of said queue until the process commits the data element to the particular memory slot of said queue.

4. A queuing system as defined in claim 3, wherein as said read pointer successively designates memory slots of said queue for dequeuing data elements therefrom, said read pointer is operative to bypass an owned memory slot and to designate the succeeding unowned memory slot.

5. A queuing system as defined in claim 3, wherein as said read pointer successively designates memory slots of said queue for dequeuing data elements therefrom, the progress of said read pointer is blocked by an owned memory slot.

6. A queuing system as defined in claim 1, wherein when said control functional block assigns ownership of said write pointer to a process of either one of the transactional system and the non-transactional system, the process acquires ownership of the particular memory slot of said queue designated by said write pointer at the time ownership of said write pointer is assigned to the process.

7. A queuing system as defined in claim 6, wherein once a process acquires ownership of a particular memory slot of said queue designated by said write pointer, the process relinquishes ownership of said write pointer whereby said write pointer designates the succeeding memory slot of said queue.

8. A queuing system as defined in claim 7, wherein when a process owns said write pointer, the process relinquishes ownership of said write pointer by line committing said write pointer.

9. A queuing system as defined in claim 1, wherein said queue is a circular buffer.

10. A queuing system as defined in claim 1, wherein said queuing system further includes a plurality of interfaces, each interface capable to perform a particular manipulation on said queue.

11. A queuing system as defined in claim 10, wherein said manipulation is either one of creating said queue and deleting said queue.

12. A queuing system as defined in claim 10, wherein said manipulation is either one of enqueuing a data element to said queue and dequeuing a data element from said queue.

13. A method for exchanging data elements between a transactional input/output (IO) system and a non-transactional IO system, said method comprising the steps of:

providing a queue that includes a plurality of memory slots;

implementing a write pointer function to successively designate memory slots of said queue to permit a process of either one of the transactional system and the non-transactional system to access the memory slots for enqueuing data elements thereto;

implementing a read pointer function to successively designate memory slots of said queue to permit a process of either one of the transactional system and the non-transactional system to access the memory slots for dequeuing and processing data elements contained therein; and implementing a control functional block to control:
  a) ownership of each one of said read and write pointers by a process of either one of the transactional system and the non-transactional system;
  b) ownership of a memory slot of said queue by a process of either one of the transactional system and the non-transactional system;

permitting a controllable exchange of data elements between the transactional system and the non-transactional system.

* * * * *